United States Patent
Thakur et al.

(10) Patent No.: US 6,665,306 B1
(45) Date of Patent: Dec. 16, 2003

(54) IMMEDIATE CUT-OFF PROTOCOL AND INTERFACE FOR A PACKET-BASED BUS CONNECTING PROCESSORS

(75) Inventors: Anshuman Thakur, Beaverton, OR (US); Frank C. Verhoorn, III, Beaverton, OR (US); Elazar Cohen, Haifi (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/444,720

(22) Filed: Nov. 24, 1999

(51) Int. Cl.[7] .............................................. H04L 12/56
(52) U.S. Cl. ...................................... 370/419; 710/110
(58) Field of Search ................................. 370/236, 401, 370/410, 419, 423, 426; 709/227, 232, 249, 253, 212, 225; 710/22, 27, 107, 110, 113

(56) References Cited

U.S. PATENT DOCUMENTS

| | | | | |
|---|---|---|---|---|
| 4,707,831 A | * | 11/1987 | Weir et al. .................. | 370/416 |
| 4,853,847 A | * | 8/1989 | Ohuchi ....................... | 713/600 |
| 5,193,159 A | * | 3/1993 | Hashimoto et al. ......... | 710/110 |
| 5,247,626 A | * | 9/1993 | Firoozmand ................ | 709/212 |
| 5,434,976 A | * | 7/1995 | Tan et al. .................... | 709/234 |
| 5,796,960 A | * | 8/1998 | Bicevskis et al. ........... | 345/555 |
| 5,961,614 A | * | 10/1999 | Christiansen ................ | 710/22 |
| 6,253,270 B1 | * | 6/2001 | Ajanovic et al. ........... | 710/107 |
| 6,256,697 B1 | * | 7/2001 | Ajanovic et al. ........... | 710/113 |
| 6,363,444 B1 | * | 3/2002 | Platko et al. ................ | 710/110 |

* cited by examiner

*Primary Examiner*—Hassan Kizou
*Assistant Examiner*—Dmitry Levitan
(74) *Attorney, Agent, or Firm*—Pillsbury Winthrop LLP

(57) ABSTRACT

A bus interface and method allow a special purpose processor and other components on a bus to efficiently communicate with a network controller. The interface and protocol support a variety of functions, including the ability to directly indicate to the network controller whether received data packets are destined for an external network entity, such as an external Ethernet controller, or for local computer memory. Additionally, the network controller can cut-off packets of data in mid-transfer to the network controller, and then later, at the command of the network controller, the data transfer may be resumed at the point within the packet at which it line was cut-off. Separate signal lines are used to inform the network controller of the general destination of the received data packets. In particular, a Transmit Request line is used to inform the network controller that data received from the special purpose processor is destined for the external network and a Loopback Request line is used to inform the network controller that data received from the special purpose processor is destined for internal computer memory.

18 Claims, 6 Drawing Sheets

IMMEDIATE CUT-OFF PROTOCOL AND INTERFACE FOR A PACKET-BASED BUS CONNECTING PROCESSORS

BACKGROUND

1. Field

The present invention relates generally to communication protocols, and more particularly, to a bus interface and protocol for efficiently connecting processors.

2. Description of Related Art

A bus is the communication path through which processors communicate with one another or with other system elements such as memory. To be able to receive and transmit intelligible signals, the processors must agree on the same set of rules to use in interpreting signals sent back and forth. This common set of rules is referred to as the bus protocol.

One example of a data bus used to interface two system components is a network controller coupled to a special purpose processor, such as a cryptographic processor providing accelerated encryption, decryption, and authentication of data packets. Cryptographic processors implement, in hardware, encryption algorithms such as the well known data encryption standard (DES), which is specified in the ANSI (American National Standards Institute) X3.92 and X3.106 standards. By closely coupling the cryptographic processor with the network controller on a single network interface card, data packets received or transmitted over the network can be encrypted and authenticated at speeds comparable to the network's bandwidth. By automatically encrypting all data sent over a network, two computers can transform an otherwise public network, such as the Internet, into a "virtual private network" (VPN).

Because performance is the biggest motivation behind doing hardware encryption and authentication, data transfers to and from the cryptographic processor and the network controller should ideally be very fast. Additionally, in order to maintain as much backwards compatibility as possible and to avoid extensive modifications to existing network controllers, it is desirable to use as few new output pins as possible from the LAN controller when interfacing it with the cryptographic processor.

SUMMARY

Systems and methods consistent with the principles of the present invention address the need identified above by efficiently interfacing a special purpose processor with a network controller.

One aspect of the present invention is a method for interfacing a special purpose processor to a network controller that links a computer system to a network. The method comprises requesting permission, via a first signal line, that data destined for the network be transferred from the special purpose processor to the network controller. Second signal lines are used to request permission that data destined for the computer system be transferred from the special purpose processor to the network controller. Data signal lines transfer data to the network controller in response to the request for permission from one of the first and second signal lines. Data received at the network controller is forwarded to the network when the data transferred to the network controller is requested with the first signal line and forwarding the data to the computer system when the data transferred to the network controller is requested with the second signal line.

Other aspects of the present invention, related to the first aspect, are directed to a network controller and a computer network.

Another aspect of the present invention is a computer network comprising a first computer system and a public network connecting the first computer system to a second computer system. The first computer system further comprises a cryptographic processor; a network controller; first signal lines connecting the cryptographic processor to the network controller; the first signal lines being used to transmit data between the special purpose processor and the network controller; and second signal lines connecting the cryptographic processor to the network controller, the second signal lines indicating whether the data transmitted to the network controller from the cryptographic processor is to be transmitted to a memory of the first computer system or to the second computer system over the public network.

Yet another aspect of the present invention is a method for interfacing a special purpose processor to a network controller. The method includes transferring a plurality of bytes of data from the special purpose processor to the network controller, the plurality of bytes being arranged as packets of data. Further, the data transfer is interrupted when the network controller deasserts a chip select line connecting the special purpose processor to the network controller, the interruption of the data transfer occurring while one of the packets is being transferred and before the packet has completed the transfer to the network controller. Finally, when the network controller reasserts the chip select line, the transfer of the interrupted packet is resumed.

One further aspect of the present invention is directed to a network controller. The network controller comprises a first set of output pins and a chip select pin. The first set of output pins transfer data organized as packets to a bus, each packet containing a plurality of bytes of information. The chip select pin, when deasserted by the network controller, indicates that one of the packets being received by the network controller from a processor connected to the bus are to cease being transmitted by the processor, and, when subsequently asserted by the network controller, the chip select pin indicates to the processor that the processor is to resume transmitting the packet to the network controller beginning at a point within the packet corresponding to the location where the processor ceased transmitting the packet.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

A bus interface and protocol are described herein that allows a special purpose processor on a bus to efficiently connect to a network, such as an Ethernet network, through a network controller. The interface and protocol support a variety of functions, such as: (1) dynamic chip selection, which allows the network controller to communicate with different components over the same pins; (2) the ability to pause a data transfer in the middle of a packet and switch to another component connected to the same pins; (3) bi-directional data transfer, including data flow control by the network controller or the special purpose processor; (4) the ability to insert invalid data byte "holes" in a data transfer; and (5) the ability to directly indicate to the network controller whether received data packets are destined for external Ethernet controllers or for local computer memory.

Figure 1:
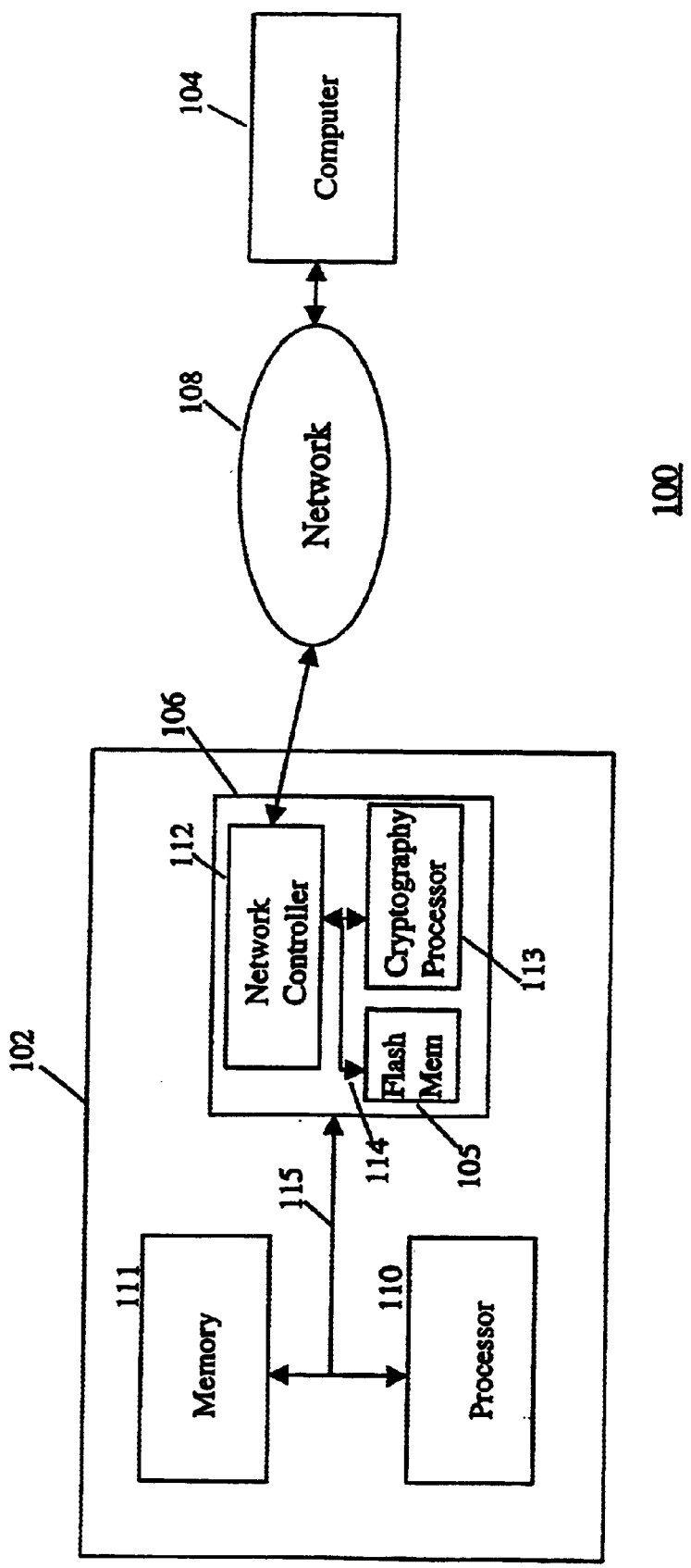
FIG. 1 is a block diagram illustrating an exemplary computer system using concepts consistent with one embodiment of the present invention.

FIG. 1 is a block diagram illustrating an exemplary computer system using concepts consistent with one embodiment of the present invention. In particular, computer system 100 includes a first computer 102 and a second computer 104. Computer 102 is illustrated as having a special purpose hardware encryption processor 113, communicating with a network controller 112. Cryptographic processor 113 and network controller 112 are both located in a network interface card (NIC) 106 of first computer 102, which connects computer 102 via network 108 to second computer 104. NIC 106 may contain additional circuit components, such as a flash RAM memory 105. Network controller 112, cryptographic processor 113, and flash memory 105 communicate with one another through bus 114 on NIC 106. The physical interface and protocol used by processor 112, cryptographic processor 113, and flash memory 105, when communicating on bus 114, will be described in more detail below.

In addition to NIC 106, computer 102 includes other components such as a main processor 110 and a computer memory 111. Computer processor 110, computer memory 111, and NIC 106 communicate with one another through one or more additional busses, such as bus 115, located in computer 102.

The second computer, computer 104, which is constructed similarly to computer 102, communicates with computer 102 over network 108. Network 108, may be, for example, a packet based Internet Protocol (IP) network such as the Internet and may physically connect with NIC 106 through an Ethernet connection. To engage in secure communication over nonsecure network 108, computers 102 and 104 encrypt their network transmissions.

Computers 102 and 104 can be any of a number of well known computer systems, such as a personal computer based on processors from Intel Corporation, of Santa Clara, Calif.

Cryptography processor 113 is a hardware cryptographic accelerator designed to assist computer 102 in encrypting and decrypting data. In particular, as shown in FIG. 1, cryptographic processor 113 interfaces directly with network controller 112 and implements, in hardware, cryptographic algorithms such as the well known data encryption standard (DES). In this manner, cryptographic processor 113 quickly decrypts and encrypts data received and transmitted over network 108. By encrypting and decrypting data packets received over network 108 in special purpose processor 113, main processor 110 does not waste processing resources. This is useful because cryptographic algorithms tend to be relatively computationally burdensome.

Figure 2:
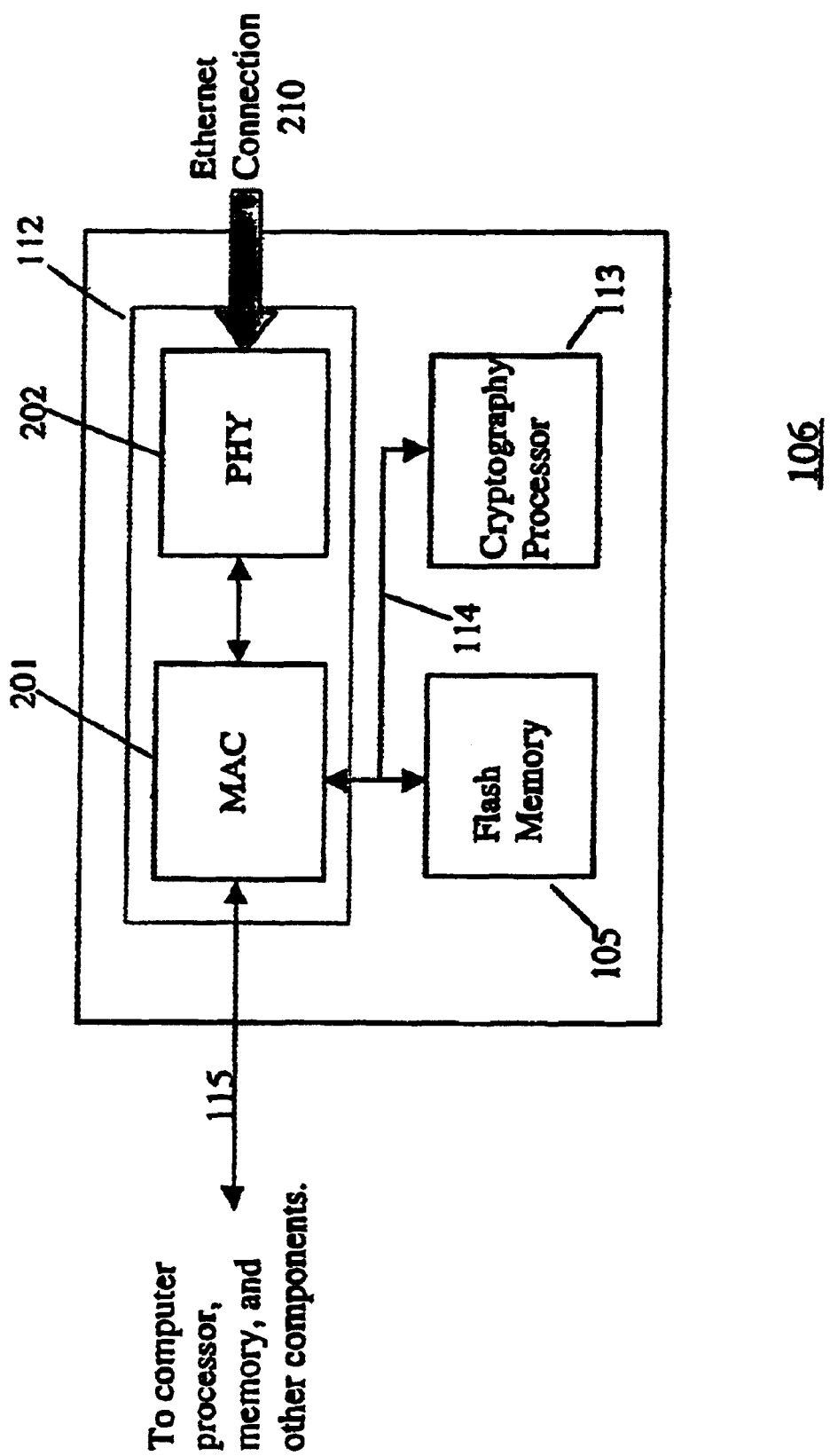
FIG. 2 is a more detailed block diagram of the network interface card shown in the embodiment of the present invention of FIG. 1.

FIG. 2 is a more detailed block diagram of NIC 106. Network controller 112 is shown in greater detail as including PHY component 202 and MAC component 201. PHY 202 implements the physical, low-level analog interface to Ethernet connection 210. MAC 201 operates in conjunction with PHY 202 and provides higher level Ethernet control functions as well as transmitting and receiving data received over the Ethernet connection 210 to busses 114 and 115.

Ethernet networks do not have a central point of arbitration. Instead, a medium access control (MAC) mechanism, such as MAC 201, handles arbitration by cooperating with all other MACs on the Ethernet. The MACs operate together to ensure that access to the network channel is fair, and that no single network entity can lock out the other entities. The interaction of MACs 201 with Ethernet connection 210 is based on the well known control mechanism called Carrier Sense Multiple Access with Collision Detection (CSMA/CD).

As previously mentioned, cryptography processor 113 communicates with network controller 112 over bus 114, which is local to the network interface card 106. It is desirable for network controller 112 and cryptographic processor 113 to communicate with one another as efficiently as possible. Because performance is the biggest motivation behind doing hardware encryption and authentication, data transfers to and from processor 113 should ideally be very fast, while at the same time using as few output pins as possible from network controllers 12.

Figure 3:
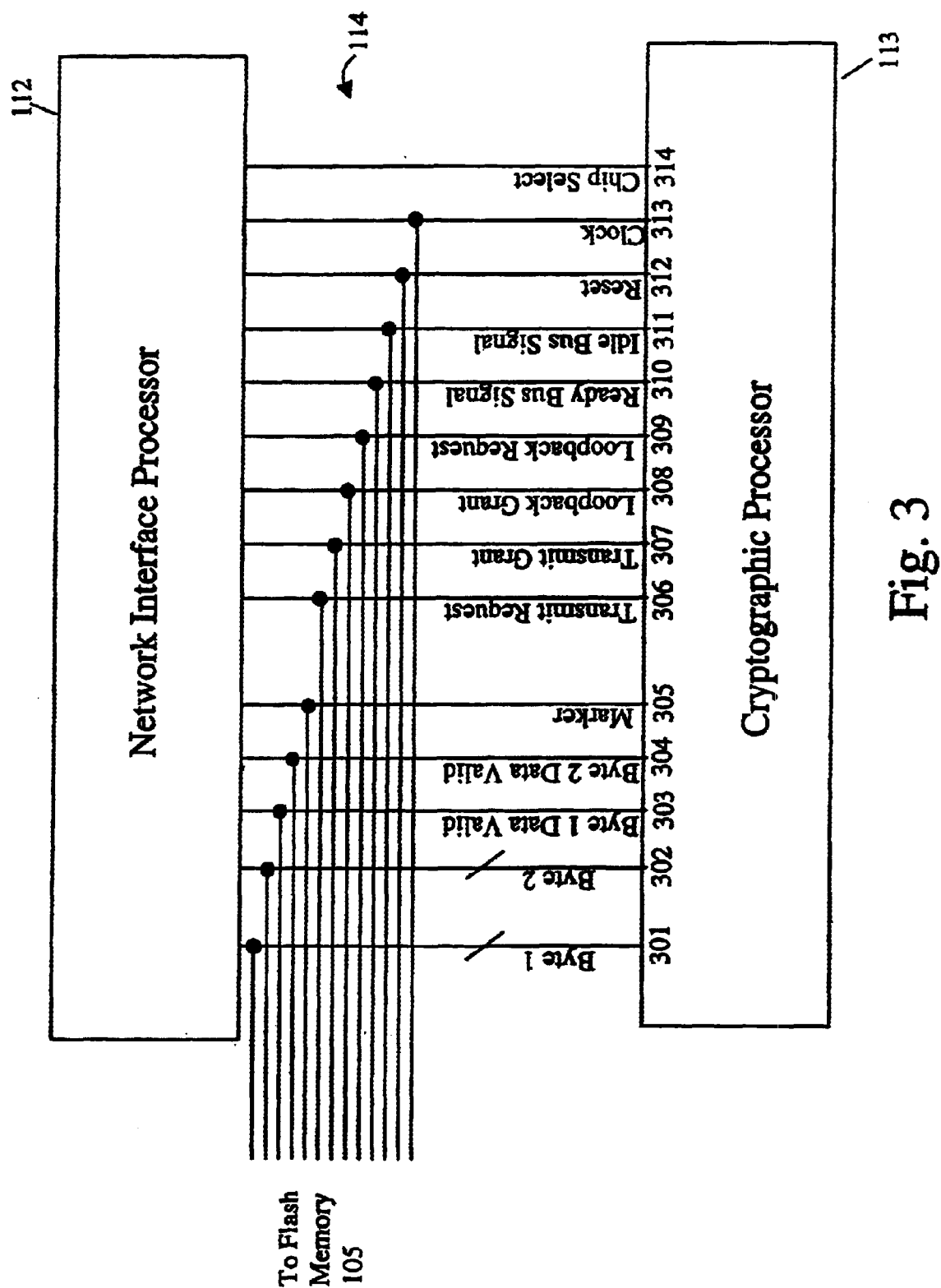
FIG. 3 is a diagram illustrating signal lines of a bus in the network interface card shown in FIG. 2.

FIG. 3 is a detailed illustration of the signal lines comprising bus 114. Bus 114 includes sixteen data lines represented by first byte lines 301 and second byte lines 302, eleven control lines illustrated as lines 303 through 313, and a clock line 314. Lines 303 through 314 are labeled as: line 303, Byte 1 Data Valid; line 304, Byte 2 Data Valid; line 305, data marker; line 306, Transmit Request; line 307, Transmit Grant; line 308, Loopback Grant; line 309, Loopback Request; line 310, Ready Bus Signal; line 311, Idle Bus Signal; line 312, Reset; line 313, Clock; and line 314, Chip Select.

A protocol consistent with the present invention for arbitrating the transmission of data on first byte lines 301 and second byte lines 302 of bus 114 will now be described in detail with reference to the timing diagrams of FIGS. 4A–4C.

To increase the throughput of data transferred from cryptographic processor 113 to either Ethernet connection 210 or memory 111, the present protocol provides cryptographic processor 113, when transferring data to network controller 112, with the ability to select either a "Transmit Request," which is a request indicating that data transferred to network controller 112 is to be placed on Ethernet 210, or a "Loopback Request," which is a request indicating that data transferred to network controller 112 is to be placed in memory 111 of host computer 102.

Figure 4A:
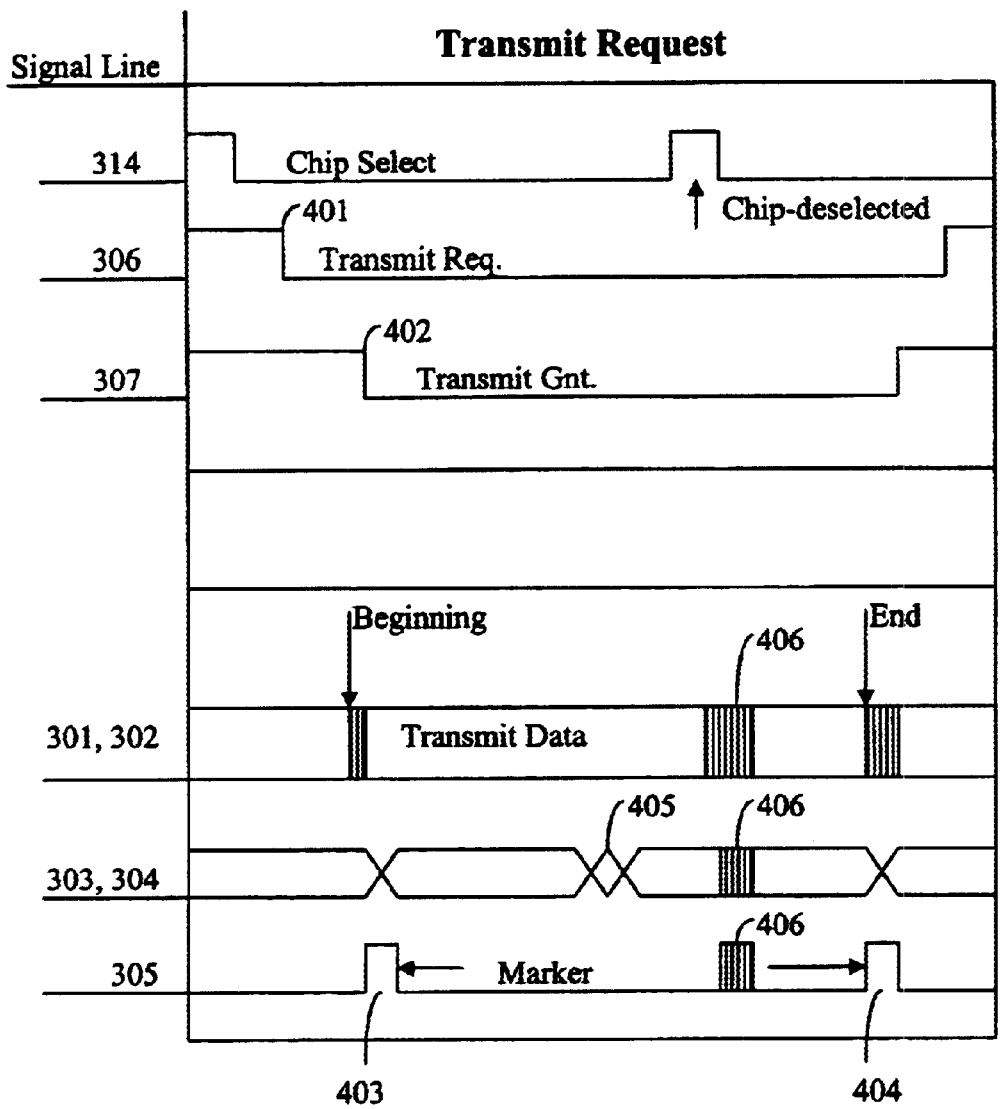
FIGS. 4A–4C are timing diagrams illustrating data transmission using a bus interface and protocol consistent with the illustrated embodiment of the present invention.

FIG. 4A is a timing diagram illustrating an exemplary data transfer during a Transmit Request in one embodiment of the present invention. Network controller 112 acts as a central arbiter and as a bus master in the present protocol by selectively providing ability and giving permission for one of the components on the bus to communicate with it. Ability to communicate is given by activating a component's chip select line. When the chip select line is active for a component, such as chip select line 314 of cryptographic processor 113, the component is active on bus 114 while other components, such as Flash memory 105, assert a high impedance state on bus 114. Conversely, when chip select 314 is not active, cryptographic processor 113 holds its output lines in a high impedance state.

To begin a Transmit Request, cryptographic processor 113 asserts transmit request line 306 (state 401). Network interface processor 112 approves the request by asserting transmit grant line 307 (state 402). In response, cryptographic processor 113 transmits data to processor 112 in multiple byte groupings called packets, with each packet delineated by a pair of marker pulses 403 and 404. Marker pulse 403 indicates the beginning of a packet and marker pulse 404 indicates the end of the packet. The bytes that comprise a packet are transmitted on Byte data lines 301 and 302 synchronously with clock signal 313. Network controller 112 correspondingly receives the data from Byte lines 301 and 302 until it detects the end of packet marker 404.

Cryptographic processor 113 may refrain from transmitting during a data transfer period indicated by clock signal 313 by deasserting Byte 1 Valid Data line 303 or Byte 2 Valid Data line 304, which respectively indicate to processor 112 that the information on Byte 1 lines 301 or Byte 2 lines 302 is not valid. An invalid state for lines 303 and 304 is shown occurring in state 405. During this time, processor 112 ignores data received on Byte Data lines 301 or 302 that correspond to the invalid data lines 303 and 304.

Network controller 112 may, at any time during a data transfer, "freeze the transfer by deasserting chip select line 314. This period is shown in FIG. 4A by cross-hatched blocks 406. Cryptographic processor 113 suspends its data output during this time and places a high impedance state on its output pins. When chip select 314 is again asserted, cryptographic processor 113 continues the data transfer. Accordingly, by selectively asserting and deasserting the chip select lines, network controller 112 can dynamically cut-off communication with cryptographic processor 113, or with other components, on bus 114. Thus, bus 114 functions as a "cut-off" bus in which packets transmitted from cryptographic processor 113 on bus 114 can be cut-off in mid-packet while network controller 112 attends to another bus component, such as flash memory 105. By reasserting the chip select line, network controller 112 resumes transfer of the cut-off packet.

Figure 4B:
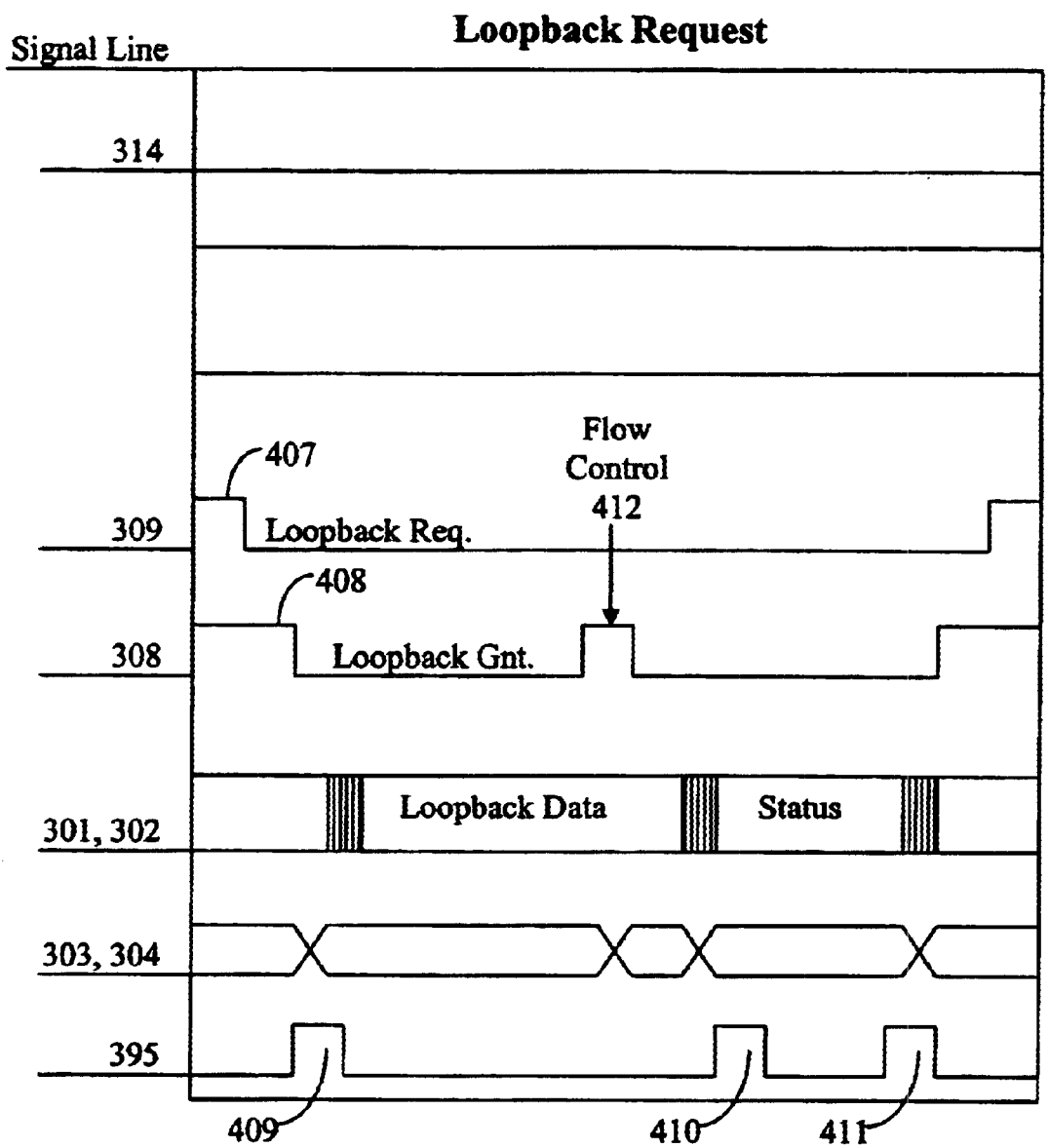
Figure 4C:
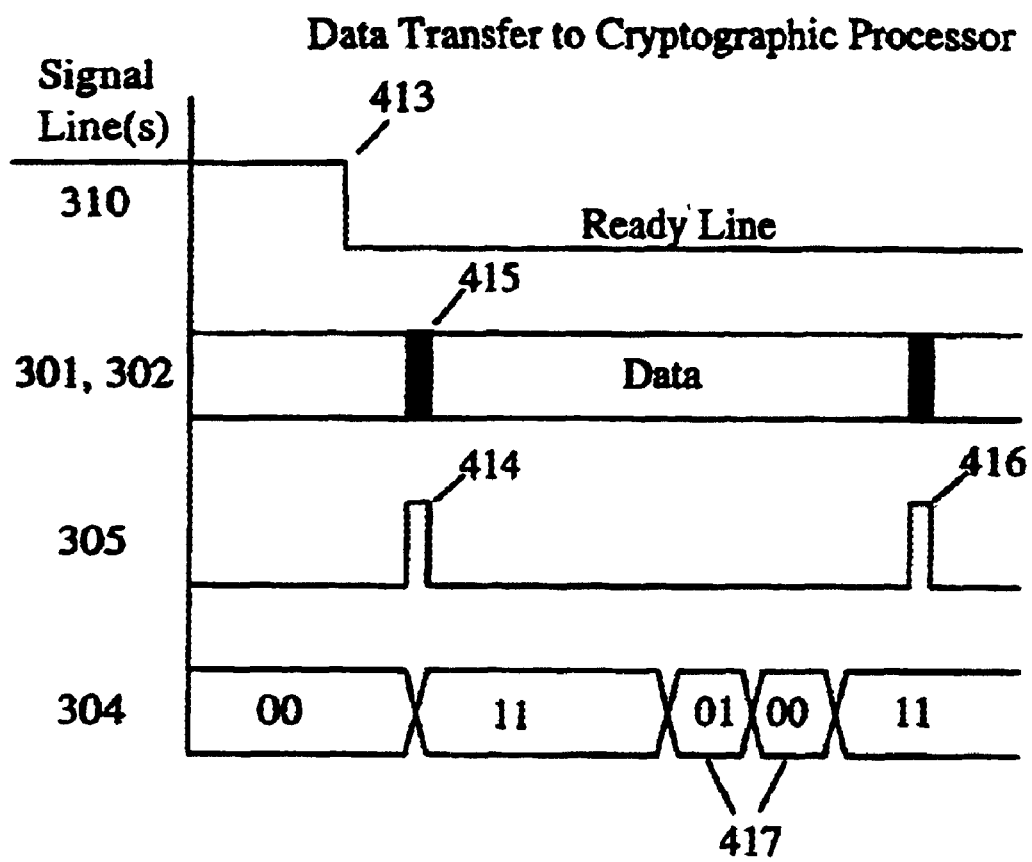

FIG. 4B is a timing diagram illustrating an exemplary data transfer during a Loopback Request in one embodiment of the present invention. In a Loopback Request, data from cryptographic processor 113 is received by network controller 112 and directly forwarded to memory 111 of computer 102.

Many of the concepts previously discussed in describing the Transmit Request also apply to a Loopback Request. For example, processor 112 may cut-off a data transfer by deasserting chip select line 314. Also, cryptographic processor 113 requests and receives permission to transmit data using Loopback Request line 309 and Loopback Grant line 308 in the same manner used with Transmit Request line 306 and Transmit Grant line 307. In particular, cryptographic processor 113 initiates a data transfer to memory 111 after asserting Loopback Request line 308 (state 407) and waiting for processor 111 to grant the data transfer request by asserting Transmit Grant line 307 (state 408).

One notable difference between a Loopback data transfer and a Transmit data transfer is that three marker signals 409, 410, and 411 are asserted to delineate packet boundaries in a Loopback request while only two are used in a Transmit request. Marker 409 indicates the beginning of a packet data transfer. Marker 410 indicates the end of the packet data transfer and the beginning of the transfer of status information relating to the packet. Marker 411 indicates the end of the status information transfer. Status information for a packet may include, for example, information relating to packet authentication.

As previously mentioned, network controller 112 has the ability to cut-off, in the midst of a packet transfer, the flow of data from cryptographic processor 113 by deasserting chip select 314. Typically, network controller 112 uses a packet cut-off if it desires to communicate with other components on the bus. Alternatively, on the other hand, if network controller 112 would like to control its incoming flow but does not need to communicate with other components on the bus, network controller deasserts the Loopback Grant line 308 during a data transfer (state 412). During the time period corresponding to this deassertion, cryptographic processor 113 refrains from transmitting data. This type of flow control applies equally as well to a Transmit request as a Loopback request. Thus, processor 112 could pause data input during a Transmit request by deasserting Transmit Grant line 307.

Cryptographic processor 113 can also implement flow control by using Data Valid lines 303 and 304. Data Valid lines 303 and 304 function identically as in a Transmit Request. That is, deasserting Data Valid lines 303 and 304 informs processor 112 that data received on corresponding data lines 301 and 302 is invalid and should be ignored.

To summarize, a Transmit Request, as described above, gives cryptographic processor 113 the ability to transmit data to network controller 112, which simultaneously begins to transfer its received packets to Ethernet 210. A Loopback Request, in a similar manner, forwards data from cryptographic processor 113 to network controller 112, which forwards the data to computer memory 111. Both network controller 112 and cryptographic processor 113 can control the rate of the data transfer. Network controller 112 controls data flow by deasserting chip select line 314, which allows network controller 112 to communicate over bus 114 with other components, or by deasserting Transmit Grant line 307 or Loopback Grant line 308. Cryptographic processor 113 controls data flow with Data Invalid lines 303 or 304, which indicate to network controller 112 that the data being received is invalid and should be discarded.

As well as receiving data from cryptographic processor 113, network controller 112 can transmit data to cryptographic processor 113. FIG. 4C is a timing diagram illustrating transmission of data from network controller 112 to cryptographic processor 113.

When network controller 112 asserts chip select line 114, and cryptographic processor 113 is ready to accept data, cryptographic processor 113 asserts Ready line 310 (state 413). By asserting Ready line 310, cryptographic processor 113 guarantees that it can accept at least one full packet. Before transmitting data to cryptographic processor 113, network controller 112 checks that Ready line 310 is asserted.

Network controller 112 signals the beginning of a packet transmission to cryptographic processor 113 by asserting a data marker (state 414) and then starting data transfer (state 415). Cryptographic processor 113 indicates the end of a packet transfer by asserting a second data marker (state 416).

Occasionally, network controller 112 may wish to temporarily pause the transmission of data to cryptographic processor 113, if, for example, the attention of network controller 112 is immediately needed to service a request from processor 110 on bus 115. In this situation, network controller 112 can assert data invalid lines 303 and 304 to indicate to cryptographic processor 113 that it should ignore the data on data lines 301 and 302 (state 417). When network controller 112 is again ready to transmit data, it simply reasserts Data Invalid lines 303 and 304.

The Reset signal line 312 is used by the processor 112 when there is a problem with a data transfer. The Reset signal instructs cryptographic processor 113 to retransmit data previously sent. The Idle Bus line 311 is asserted by cryptographic processor 113 when it is sitting idle.

As described above, an efficient but interface and protocol enables a network controller to effectively interface a plurality of components with an Ethernet network. The bus interface and protocol allows the network controller to cut-off communication with one of the components in the middle of a packet transfer, and then to resume the packet transfer when the component is reactivated.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A network controller connected to a special purpose processor via a bus, the network controller coupling a computer system to a computer network, and comprising:

first pins connecting the special purpose processor to the network controller, the first pins being used to transmit data between the special purpose processor and the network controller; and second pins connecting the special purpose processor to the network controller, the second pins being used to indicate whether the data transmitted to the network controller from the special purpose processor is to be forwarded to a memory of the computer system or to the computer network.

2. A network controller connected to a special purpose processor via a bus, the network controller coupling a computer system to a computer network, and comprising:

first pins connecting the special purpose processor to the network controller, the first pins being used to transmit data between the special purpose processor and the network controller;

second pins connecting the special purpose processor to the network controller, the second pins being used to indicate whether the data transmitted to the network controller from the special purpose processor is to be forwarded to a memory of the computer system or to the computer network; and a marker signal pin connecting the special purpose processor to the network controller, the marker signal pin being used to delineate the beginning and ending of a plurality of bytes of data grouped into a data packet and transmitted from the special purpose processor to the network controller.

3. A network controller connected to a special purpose processor via a bus, the network controller coupling a computer system to a computer network, and comprising:

first pins connecting the special purpose processor to the network controller, the first pins being used to transmit data between the special purpose processor and the network controller;

second pins connecting the special purpose processor to the network controller, the second pins being used to indicate whether the data transmitted to the network controller from the special purpose processor is to be forwarded to a memory of the computer system or to the computer network; and data valid signal pins connecting the special purpose processor to the network controller, the data valid signal pins being used to indicate to the network controller that data being received by the network controller is invalid.

4. A network controller connected to a special purpose processor via a bus, the network controller coupling a computer system to a computer network, and comprising:

first pins connecting the special purpose processor to the network controller, the first Dins being used to transmit data between the special purpose processor and the network controller;

second pins connecting the special purpose processor to the network controller, the second pins being used to indicate whether the data transmitted to the network controller from the special purpose processor is to be forwarded to a memory of the computer system or to the computer network; and a chip select signal pin connecting the special purpose processor to the network controller, the chip select signal pin, when deactivated by the network controller, causing the special purpose processor to source a high impedance state to the first pins.

5. A network controller of connected to a special purpose processor via a bus, the network controller coupling a computer system to a computer network, and comprising:

first pin connecting the special purpose processor to the network controller, the first pin being used to transmit data between the special purpose processor and the network controller; and second pins connecting the special purpose processor to the network controller, the second pins being used to indicate whether the data transmitted to the network controller from the special purpose processor is to be forwarded to a memory of the computer system or to the computer network, wherein the second pins further include a grant signal pin that, when deasserted by the network processor while receiving the data from the special purpose processor, causes the special purpose processor to cease transmitting data until the network processor again asserts a signal on the grant signal pin.

6. A method for interfacing a special purpose processor to a network controller that links a computer system to a network, the method comprising: requesting permission, via a first signal line, that data destined for the network be transferred from the special purpose processor to the network controller; requesting permission, via a second signal line, that data destined for the computer system be transferred from the special purpose processor to the network controller; transferring data to the network controller, via data signal lines, in response to the request for permission via one of the first and second signal lines; and forwarding data received at the network controller to the network when the data transferred to the network controller was requested with the first signal line and forwarding the data to the computer system when the data transferred to the network controller was requested with the second signal line.

7. The method of claim 6, wherein data forwarded to the network is assembled into packets.

8. The method of claim 7, wherein the network is an Ethernet network.

9. The method of claim 6, wherein the special purpose processor is a cryptographic processor.

10. A method for interfacing a special purpose processor to a network controller that links a computer system to a network, the method comprising:
   requesting permission, via a first signal line, that data destined for the network be transferred from the special purpose processor to the network controller;
   requesting permission, via a second signal line, that data destined for the computer system be transferred from the special purpose processor to the network controller;
   transferring data to the network controller, via data signal lines, in response to the request for permission via one of the first and second signal lines;
   forwarding data received at the network controller to the network when the data transferred to the network controller was requested with the first signal line and forwarding the data to the computer system when the data transferred to the network controller was requested with the second signal line; and
   pausing the transfer of the data from the special purpose processor to the network controller in response to the network controller deasserting a chip select signal line connecting the network controller and the special purpose processor.

11. A method for interfacing a special purpose Processor to a network controller that links a computer system to a network, the method comprising:
   requesting permission, via a first signal line, that data destined for the network be transferred from the special purpose processor to the network controller;
   requesting permission, via a second signal line, that data destined for the computer system be transferred from the special purpose processor to the network controller;
   transferring data to the network controller, via data signal lines, in response to the request for permission via one of the first and second signal lines:
   forwarding data received at the network controller to the network when the data transferred to the network controller was requested with the first signal line and forwarding the data to the computer system when the data transferred to the network controller was requested with the second signal line; and
   pausing the transfer of the data from the special purpose processor to the network controller in response to the network controller deasserting a transfer grant signal line connecting the network controller and the special purpose processor.

12. A method for interfacing a special purpose processor to a network controller that links a computer system to a network, the method comprising:
   requesting permission, via a first signal line, that data destined for the network be transferred from the special purpose processor to the network controller;
   requesting permission, via a second signal line, that data destined for the computer system be transferred from the special purpose processor to the network controller;
   transferring data to the network controller, via data signal lines, in response to the request for permission via one of the first and second signal lines;
   forwarding data received at the network controller to the network when the data transferred to the network controller was requested with the first signal line and forwarding the data to the computer system when the data transferred to the network controller was requested with the second signal line; and
   notifying the network controller that data received on the data signal lines is invalid by deasserting a data valid signal line connecting the special purpose processor and the network controller.

13. A method for interfacing a special purpose processor to a network controller that links a computer system to a network, the method comprising:
   requesting permission, via a first signal line, that data destined for the network be transferred from the special purpose processor to the network controller;
   requesting permission, via a second signal line, that data destined for the computer system be transferred from the special purpose processor to the network controller;
   transferring data to the network controller, via data signal lines, in response to the request for permission via one of the first and second signal lines;
   forwarding data received at the network controller to the network when the data transferred to the network controller was requested with the first signal line and forwarding the data to the computer system when the data transferred to the network controller was requested with the second signal line, wherein data forwarded to the network is assembled into packets; and
   indicating the beginning and ending of a data packet by asserting a marker signal line that connects the network controller to the special purpose processor.

14. A computer network comprising:
   a first computer system;
   a public network connecting the first computer system to a second computer system;
   the first computer system further comprising:
      a cryptographic processor;
      a network controller coupling the first computer system to the public network;
      first signal lines connecting the cryptographic processor to the network controller, the first signal lines being used to transmit data between the cryptographic processor and the network controller; and
      second signal lines connecting the cryptographic processor to the network controller, the second signal lines indicating whether the data transmitted to the network controller from the cryptographic processor is to be transmitted to a memory of the first computer system or to the second computer system over the public network.

15. The computer network of claim 14, wherein information generated by the first computer system and intended for the second computer system is transmitted from the network controller to the cryptographic processor, encrypted by the cryptographic processor, and transmitted back to the network controller at a rate equal to a bandwidth of the network.

16. A special purpose processor connected to a network controller via a bus, the special purpose processor comprising:

data signal pins connecting the special purpose processor to the network controller, the data signal pins being used to transmit data between the special purpose processor and the network controller, the transmitted data being organized as packets each containing a plurality of bytes of data;

a chip select signal pin connecting the special purpose: processor to the, network controller, the special purpose processor responding to a deassertion of the chip select signal pin by the network controller by stopping transmission of a packet and presenting a high impedance state to the data signal pins, and, when the chip select signal pin is subsequently asserted by the network controller, the special purpose processor resuming transmission of the packet to the network controller at a point within the packet corresponding to the location where the special purpose processor stopped transmitting the packet; and signal pins connecting the special purpose processor to the network controller, the signal pins being used to indicate whether the packets transmitted to the network controller from the special purpose processor are to be forwarded to a local computer memory or to an entity connected to the bus via an Ethernet network.

17. A method for interfacing a special purpose processor to a network controller, the method comprising:

transferring a plurality of bytes of data from the special purpose processor to the network controller, the plurality of bytes being arranged as packets of data;

interrupting the data transfer when the network controller deassert a chip select line connecting the special purpose processor to the network controller, the interruption of the data transfer occurring while one of the packets is being transferred, and before the packet has completed the transfer to the network controller;

resuming transfer of the interrupted packet, when the network controller reasserts the chip select line, at a point within the packet corresponding to the location where the special purpose processor interrupt ted the data transfer;

requesting permission, via a first signal line, that data destined for an Ethernet network connected to the network controller be transferred from the special purpose processor to the network controller; and requesting permission, via a second signal line, that data destined for a computer memory local to the network controller be transferred from the special purpose processor to the network controller;

wherein transferring the plurality of bytes of data from the special purpose processor to the network controller is performed in response to the request for permission via one of the first and second signal lines, and the network controller forwards data received at the network controller to the network when the data transferred to the network controller was requested with the first signal line and forwarding the data to the computer system when the data transferred to the network controller was requested with the second signal line.

18. A network controller comprising:

a first set of output pins for transferring data organized as packets to a bus, each packet containing a plurality of bytes of information;

a chip select pin that, when deasserted by the network controller, indicates that one of the packets being received by the network controller from a processor connected to the bus are to cease being transmitted by the processor, and, when subsequently asserted by the network controller, the chip select pin indicating to the processor that the processor is to resume transmitting the packet to the network controller beginning at a point within the packet corresponding to the location where the processor ceased transmitting the packet; and pins for indicating whether the transferred packets transmitted are to be forwarded to a local computer memory or to an entity connected to the bus via an Ethernet network.

\* \* \* \* \*